Aug. 23, 1938.   R. S. ADAMS   2,127,669
STOP LIGHT SWITCH
Filed Feb. 18, 1937   2 Sheets-Sheet 1

Inventor
Ralph S. Adams

By Clarence A. O'Brien
Hyman Berman
Attorneys

Aug. 23, 1938.   R. S. ADAMS   2,127,669
STOP LIGHT SWITCH
Filed Feb. 18, 1937   2 Sheets-Sheet 2
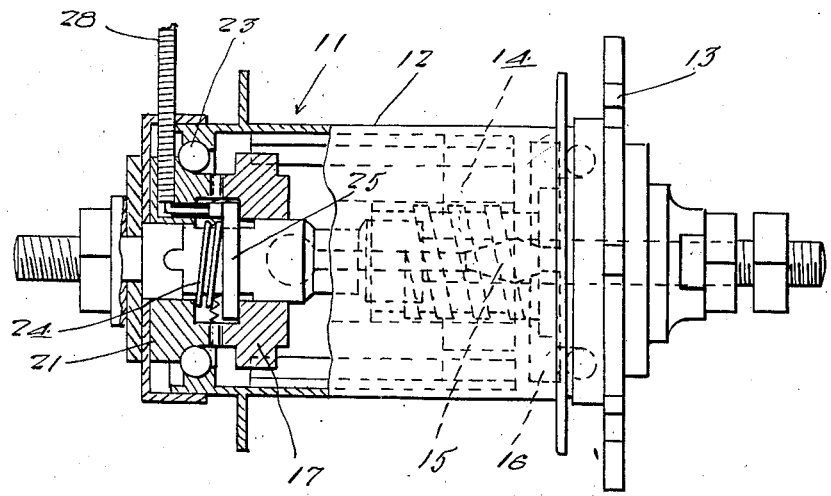
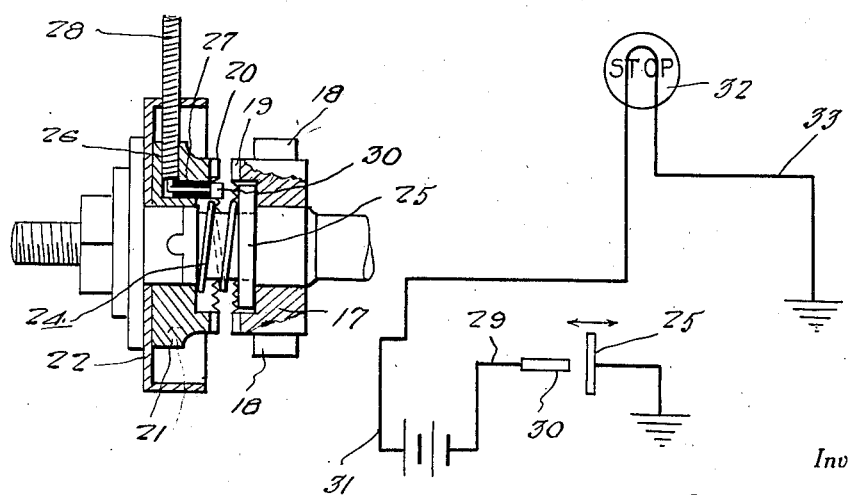
Inventor
Ralph S. Adams
By Clarence A. O'Brien
Hyman Berman
Attorneys Patented Aug. 23, 1938

2,127,669

UNITED STATES PATENT OFFICE 2,127,669

STOP LIGHT SWITCH

Ralph S. Adams, Charleston, W. Va.

Application February 18, 1937, Serial No. 126,481

1 Claim. (Cl. 200—52)

This invention appertains to new and useful improvements in stop light switches and more particularly to a stop light switch for occupant propelled vehicles, such as bicycles and the like.

The principal object of the present invention is to provide a stop light especially adapted for use on bicycles wherein the automatic switch means is installed so that when the usual coaster brake is operated a circuit including the stop light is completed, thus energizing the stop light to warn rearwardly approaching vehicles.

Other advantages and objects of the invention will become apparent to the reader of the following specification.

In the drawings:—

Figure 2 is a fragmentary detailed sectional view through the coaster brake showing the switch means.

Figure 3 is a fragmentary detailed sectional view showing the coaster brake elements with which the switch is associated in separated relation.

Figure 5 is a diagrammatic view showing the electrical connection between the electrical devices involved.

Figure 1:
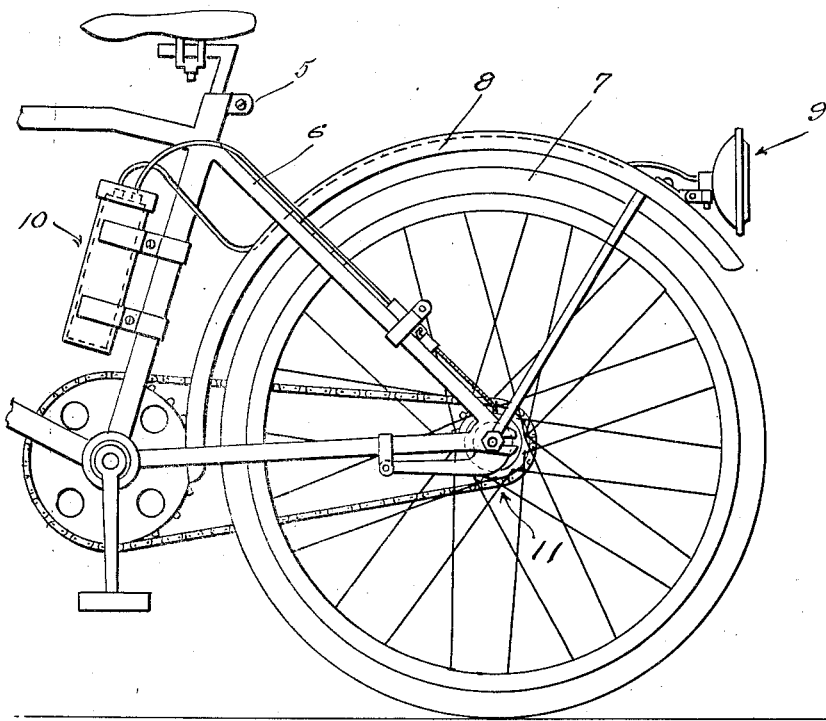
Figure 1 represents a fragmentary side elevational view of the bicycle and stop light.
Figure 4:
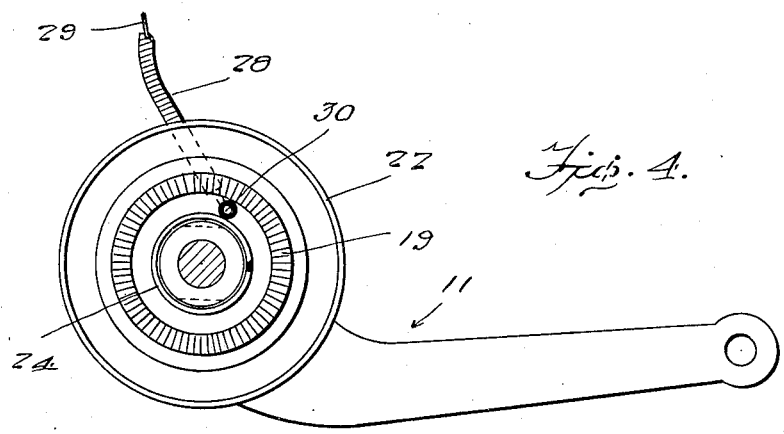
Figure 4 is a side elevational view of the cap portion of the coaster brake showing the brush installed.

Referring to the drawings wherein like numerals designate like parts, it can be seen that numeral 5 generally refers to the bicycle which includes the frame 6, the rear wheel 7 and mud guard 8 therefor. Numeral 9 generally refers to the stop light, while numeral 10 generally refers to the battery for the stop light. Numeral 11 generally refers to the coaster brake in which the switch for the stop light is installed.

This coaster brake is preferably of the conventional design consisting of the outer shell 12, with the chain sprocket placed in one end for operating the worm 14 so that the wedge members 15 will expand the ring 16 to perform the usual braking operation. Numeral 17 represents the usual movable collar which carries the wedges 18 and this has teeth 19 on one side thereof engageable with the teeth 20 on the stationary collar 21 with which the cap 22 is associated for overlapping the adjacent end of the shell 12. Ball bearings 23 are provided at suitable points to reduce friction. The spring 24 is conventional but in the present instance is installed between the fixed collar 21 and the collector ring 25 for always keeping the collector ring snugly against the collar 17. The collar 21 is provided with an L-shaped opening 26 therein into one end of which is driven the tube 27 of insulation while into the other is disposed the flexible conduit 28 through which the conductor 29 from the battery 10 extends to pass through the bushing or tube 27 to the contact 30 which is opposed to the collector ring 25.

As is shown in Figure 5, a jumper 31 extends from the other side of the battery to the lamp 32 of the stop light 9 and, of course, the other side of the lamp 32 is grounded as at 33.

It can now be seen, that normally when the coaster brake is in wheel driving position or at neutral the collar 17 is spaced from the collar 21 and the brush or contact 30 does not engage the collector ring 25.

However, when the coaster brake is back-pedaled, the collar 17 moves toward the collar 21, thus causing the collector ring 25 to engage the contact 30, thus completing the circuit while the brush 30 is riding around the collector ring 25.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A switch structure comprising in combination a pair of coaster brake clutch members, a conductor ring on one of the said clutch members, and a contact on the other clutch member for riding engagement with said conductor ring when the clutch elements are brought together, the last-mentioned clutch member being provided with a radially extending bore opening through its periphery for receiving a conductor cable, said last-mentioned clutch element also formed with an axially extending bore meeting the inner end of the radial bore, and a plug of insulation in the axially disposed bore in which the contact is mounted.

RALPH S. ADAMS.